(12) United States Patent
Probst et al.

(10) Patent No.: US 7,739,307 B2
(45) Date of Patent: Jun. 15, 2010

(54) DIGITAL ASSET DATA TYPE DEFINITIONS

(75) Inventors: Bruce E. Probst, Croton-on-Hudson, NY (US); Carl Hixson, Chatham, NJ (US); Anne Moroney, New York, NY (US)

(73) Assignee: Home Box Office, Inc., New York, NY (US)

( * ) Notice: Subject to any disclaimer, the term of this patent is extended or adjusted under 35 U.S.C. 154(b) by 428 days.

(21) Appl. No.: 11/787,270

(22) Filed: Apr. 12, 2007

(65) Prior Publication Data

US 2007/0208720 A1      Sep. 6, 2007

Related U.S. Application Data

(60) Continuation of application No. 11/232,263, filed on Sep. 20, 2005, now Pat. No. 7,209,917, which is a division of application No. 10/016,679, filed on Dec. 12, 2001, now Pat. No. 7,558,781.

(60) Provisional application No. 60/254,991, filed on Dec. 12, 2000.

(51) Int. Cl.
*G06F 17/30* (2006.01)

(52) U.S. Cl. .................... 707/796; 707/803; 707/812

(58) Field of Classification Search .................. None
See application file for complete search history.

(56) References Cited

U.S. PATENT DOCUMENTS

| | | | |
|---|---|---|---|
| 5,544,354 A | 8/1996 | May et al. | |
| 5,659,350 A | 8/1997 | Hendricks et al. | |
| 5,659,368 A | 8/1997 | Landis | |
| 5,671,409 A | 9/1997 | Fatseas et al. | |
| 5,675,752 A | 10/1997 | Scott et al. | |
| 5,752,244 A | 5/1998 | Rose et al. | |
| 5,857,707 A | 1/1999 | Devlin | |
| 5,895,470 A | 4/1999 | Pirolli et al. | |

(Continued)

FOREIGN PATENT DOCUMENTS

WO      WO 00/08909      2/2000

(Continued)

OTHER PUBLICATIONS

Kshitij Shah et al., "Logical Information Modeling Of Web-Accessible Heterogeneous Digital Assets," Research and Technology Advances in Digital Libraries, 1998, ADL 98 Proceedings, IEEE International Forum, pp. 266-275, Apr. 22, 1998.

(Continued)

*Primary Examiner*—Cam Y T Truong
(74) *Attorney, Agent, or Firm*—Jones Day; Garry J. Tuma

(57) ABSTRACT

Data definitions for digital assets, such as, for example, audio, video, photographs, graphics, and electronic documents, are provided that allow these different asset types to be stored in a single database. The definitions are preferably in XML and can be used as a standardized dictionary to more efficiently and economically manage digital assets, thus improving system interoperability between companies or organizations within a company. A digital asset ordering interface, hardware system, software arrangement, and application interface configuration advantageously using these data definitions are also provided.

16 Claims, 7 Drawing Sheets

U.S. PATENT DOCUMENTS

| | | | |
|---|---|---|---|
| 5,907,323 | A | 5/1999 | Lawler et al. |
| 6,006,332 | A | 12/1999 | Rabne et al. |
| 6,056,786 | A | 5/2000 | Rivera et al. |
| 6,065,042 | A * | 5/2000 | Reimer et al. ............... 709/203 |
| 6,094,649 | A | 7/2000 | Bowen et al. |
| 6,122,617 | A | 9/2000 | Tjaden |
| 6,157,931 | A | 12/2000 | Cane et al. |
| 6,182,029 | B1 | 1/2001 | Friedman |
| 6,226,675 | B1 | 5/2001 | Meltzer et al. |
| 6,233,592 | B1 | 5/2001 | Schnelle et al. |
| 6,236,395 | B1 * | 5/2001 | Sezan et al. ................ 715/723 |
| 6,240,407 | B1 | 5/2001 | Chang et al. |
| 6,263,332 | B1 | 7/2001 | Nasr et al. |
| 6,311,194 | B1 * | 10/2001 | Sheth et al. ................ 715/236 |
| 6,377,956 | B1 | 4/2002 | Hsu et al. |
| 6,380,950 | B1 | 4/2002 | Montgomery et al. |
| 6,389,538 | B1 | 5/2002 | Gruse et al. |
| 6,418,421 | B1 | 7/2002 | Hurtado et al. |
| 6,487,145 | B1 | 11/2002 | Berhan |
| 6,519,617 | B1 | 2/2003 | Wanderski et al. |
| 6,538,623 | B1 | 3/2003 | Parnian et al. |
| 6,584,153 | B1 | 6/2003 | Gordon et al. |
| 6,593,936 | B1 * | 7/2003 | Huang et al. ................ 345/619 |
| 6,625,810 | B1 | 9/2003 | Murphy et al. |
| 6,628,303 | B1 * | 9/2003 | Foreman et al. ............. 715/723 |
| 6,671,732 | B1 | 12/2003 | Weiner |
| 6,745,206 | B2 | 6/2004 | Mandler et al. |
| 7,020,839 | B1 | 3/2006 | Hosoda |
| 7,028,252 | B1 * | 4/2006 | Baru et al. .................. 715/273 |
| 2004/0249708 | A1 | 12/2004 | Jacobs et al. |

FOREIGN PATENT DOCUMENTS

| | | |
|---|---|---|
| WO | WO 00/52590 | 9/2000 |

OTHER PUBLICATIONS

Jane Hunter et al., "A Comparison Of Schemas For Video Metadata Representation," Computer Networks, vol. 31, Elsevier Science, pp. 1431-1451, May 17, 1999.

Jayavel Shanmugasundaram et al., "Relational Databases For Querying XML Documents: Limitations and Opportunities," Proceedings Of The 25$^{th}$ International Conference On Very Large Data Bases, Edinburgh, Scotland, pp. 302-314, Sep. 7, 1999.

Mary Fernandez et al., "SilkRoute: Trading Between Relations And XML," Computer Networks, vol. 33, Elsevier Science, pp. 723-745, 2000.

\* cited by examiner

DIGITAL ASSET DATA TYPE DEFINITIONS

CROSS REFERENCE TO RELATED APPLICATIONS

This is a continuation of U.S. application Ser. No. 11/232,263, filed Sep. 20, 2005, now U.S. Pat. No. 7,209,917, which is a division of U.S. application Ser. No. 10/016,679, filed Dec. 12, 2001, now U.S. Pat. No. 7,558,781, which claims the benefit of U.S. Provisional Application No. 60/254,991, filed Dec. 12, 2000.

BACKGROUND OF THE INVENTION

This invention relates to storing, retrieving, and tracking digital data. More particularly, this invention relates to data definitions that allow disparate types of digital assets, such as, for example, photographs, graphics, audio, video, and text documents, to be easily and economically stored, retrieved, and tracked.

Data definitions may be written using XML (extensible markup language). XML is a condensed form of SGML (standard generalized markup language), which is an information management standard that provides documents that retain formatting, indexing, and linked information—independent of application and platform. XML and SGML can be used to organize and present information on the World Wide Web.

Many companies maintain or access large libraries of various audio, visual, and textual assets. Such assets typically include content and metadata. Content may be, for example, still photographs, audio recordings, video recordings, combined audio/video recordings, combined audio/still photograph recordings, graphics, etc. Metadata is "information about information," that is, information used to identify or classify the content. Metadata can include, for example, content titles, version numbers, authors, captions, and other descriptive information relevant to the content.

Such assets are often stored in disparate repositories and on disparate media (e.g. audio and video cassette tapes, motion picture film, photographic negatives, digital video discs, etc.). Accordingly, a significant amount of time is often required to locate a particular asset and then deliver a copy of it. For example, it may take several days to locate and manually copy an audio track stored on a reel-to-reel tape located at a creative services or marketing department of a company in California and then have that copy shipped to a business affairs department or sister company in New York. This process, known as repurposing, is manually intensive and prone to errors. Furthermore, keeping track of asset usage (e.g., who has asset copies) is also a manually intensive process prone to errors. Accordingly, it can cost thousands or even millions of dollars annually for a company to manage such assets.

In an attempt to reduce these costs, some companies store assets digitally in one or more computer databases. These assets can then be retrieved electronically using appropriate software applications. However, known applications are limited. For example, databases are commonly structured to store only one type of digital asset, such as, for example, only photographs. The number, size, and formats of record fields used in the database, characters delimiting the end of files, file size of database records, etc. are all usually customized (and limited) to that one type of asset. Even those few databases that are known to store more than one asset type are also limited with respect to record field definitions and record file size, making them incompatible for use with many other types of digital assets. Such databases are thus impractical for storing a large variety of different types of digital assets.

In sum, storing disparate asset types in a single repository having information and formatting sufficient for identification and retrieval by a single software application or computer platform is not known. Moreover, no standardized definitional dictionary for digital assets is known. Thus, system interoperability between two or more companies or two or more organizations within a company having different types of digital assets is still very difficult.

In view of the foregoing, it would be desirable to be able to provide a standardized dictionary of data definitions for disparate types of digital assets.

It would also be desirable to be able to provide data definitions for application and platform independent search, retrieval, delivery, and tracking of digital assets.

It would further be desirable to be able to provide data definitions that reduce digital asset search time.

It would still further be desirable to be able to provide data definitions that reduce digital asset delivery time.

SUMMARY OF THE INVENTION

It is an object of this invention to provide a standardized dictionary of data definitions for disparate types of digital assets.

It is also an object of this invention to provide data definitions for application and platform independent search, retrieval, delivery, and tracking of digital assets.

It is a further object of this invention to provide data definitions that reduce digital asset search time.

It is a still further object of this invention to provide data definitions that reduce digital asset delivery time.

In accordance with this invention, data definitions are provided for digital assets that include a hierarchical structure that reflects the relationships between attributes and categories of content. These definitions, preferably encoded in XML, can be used as a standardized dictionary to create a digital asset library that is easily and economically manageable. The data definitions are applicable to digital assets of disparate data types and include metadata identifiers sufficient to uniquely identify those digital assets.

A method of retrieving digital assets from a digital asset library is also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention provides data definitions, preferably in XML, for disparate types of digital assets, such as, for example, artwork, logos, photographs, video, graphics, music, still photographs, promotion stills, promos (e.g., an audio or video promotional announcement), tapes, soundtracks, text, video frames (a single image from a video recording), video clips (a group of images from a video recording), and dailies (unedited and unprocessed video or film typically recorded the previous day). Digital assets include content (i.e., the actual asset data) and metadata. Data definitions of the invention advantageously permit a single database to be used for storing, retrieving, and tracking different types of assets whose contents are preferably stored either on the same computer as the database, in the database, on a computer linked to the database via the same network, or combinations thereof. These data definitions allow, for example, employees, affiliates, and customers to relatively easily and economically replicate or transfer assets between repositories where the assets are located and destinations where the assets are currently needed. Furthermore, electronic records can be created to allow usage of those assets to be easily tracked. Thus, the costs associated with managing those assets are significantly reduced.

Figure 1:
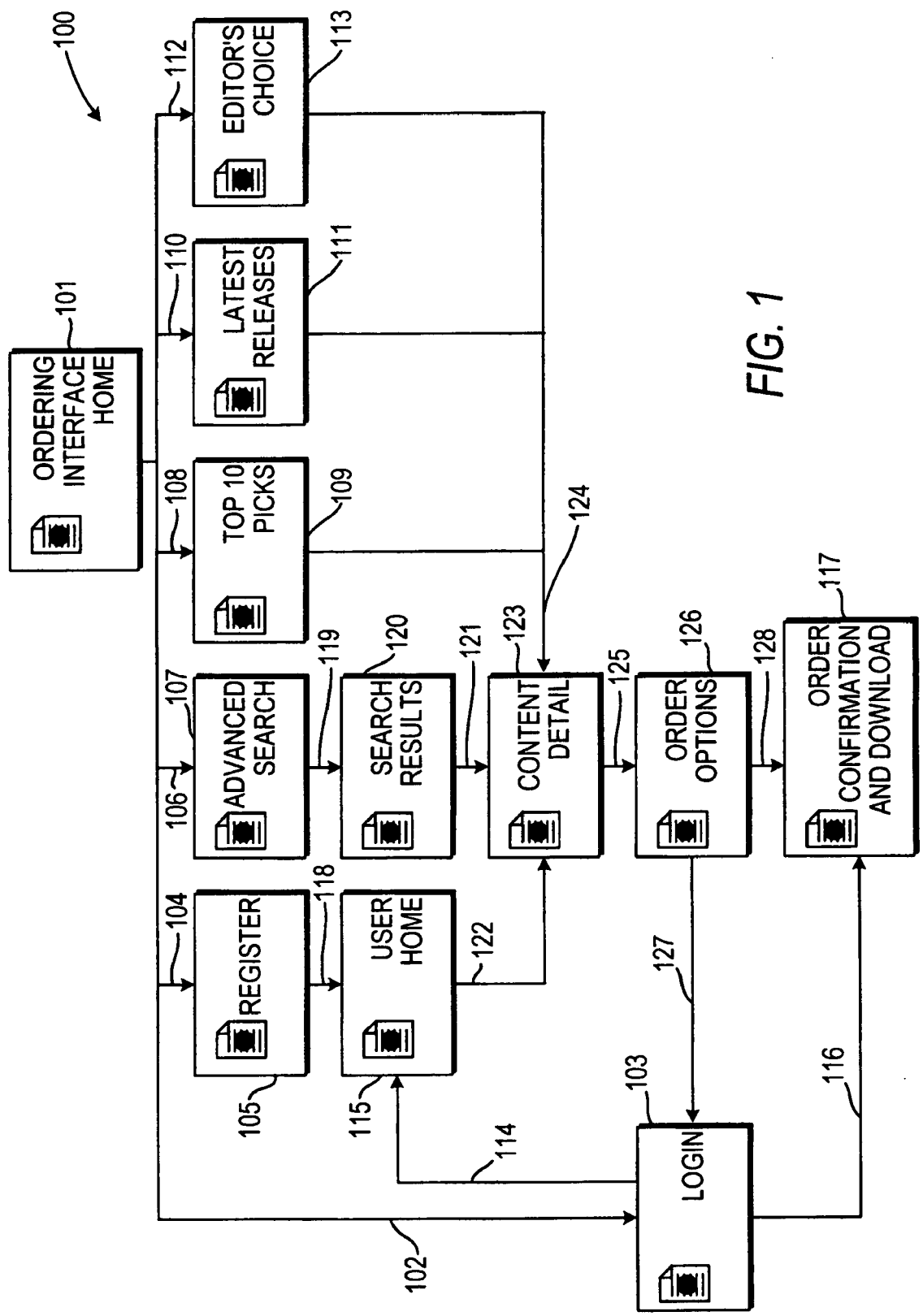
FIG. 1 is a flow chart of an interface for ordering digital assets using data definitions according to the invention.

FIG. 1 shows an interface for searching and ordering digital assets facilitated by the invention. System Home Screen 101 is preferably the first screen a user views when searching for a digital asset (e.g., a video program). While at Home Screen 101, users may enter search criteria before proceeding to another screen. However, this is alternatively not necessary. From Home Screen 101, the user may proceed in one of the following ways: along path 102 to Login Screen 103, along path 104 to Register Screen 105, along path 106 to Advanced Search Screen 107, along path 108 to Top Picks Screen 109, along path 110 to Latest Releases Screen 111, or along path 112 to Editor's Choice Screen 113.

At Login Screen 103, users login to a secured version of a search system associated with interface 100. A user entering Login Screen 103 along path 102 is preferably directed along path 114 to User Home Screen 115 unless the user entered search criteria while viewing Home Screen 101. In that case, the user is preferably directed to Order Confirmation and Download Screen 117 along path 116. Similarly, if the user entered Login Screen 103 along path 127, the user is also preferably directed to Order Confirmation and Download Screen 117.

At Register Screen 105, users register to use the system. Users may be assigned or may freely choose a username, password, and any other relevant identifying information. Users may be prompted by Register Screen 105 to enter information deemed relevant or necessary by the system. After registering, users are preferably directed along path 118 to User Home Screen 115.

At Advanced Search Screen 107 users enter or are given pre-defined criteria with which the database of the invention can be searched. Screen 107 preferably allows users to generate advanced search criteria including, but not limited to, searching specific strings, numeric values, fields or combinations of fields containing data, as well as allowing users to define complex or simple search expressions using boolean or other logic, wildcards, multiple search criteria, or any other type of search functionality. Preferably, upon an indication by a user or upon a pre-defined system event (for example, expiration of a timer), a user will be directed along path 119 to Search Results Screen 120.

At Top Picks Screen 109, a user can view and select from a subset of assets defined in the database. This subset may be predefined by the user, the system, or a system administrator. The subset may be defined as the most viewed assets, most searched for assets, most retrieved assets, most popular assets, or top assets based on a criteria defined by a user, the system, or an administrator.

At Latest Releases Screen 111, a user can view and select from a subset of assets in the database. This data is preferably a subset of the most recently added assets in the database. However, the subset may be defined as the most recently released assets, most recently produced assets, or any other desired subset of data in the database.

At Editor's Choice Screen 113, a user can view and select from a subset of assets defined in the database. This subset is preferably a selection of assets that one or more editors, within the company or organization viewing or providing the database, has selected as being desirable for viewing based on one or more criteria defined by the editors.

At User Home Screen 115, a user can view personalized or standard information relating to that user's usage of the database. The system may present the user with search possibilities, the ability to view some subset of assets defined in the database, a listing of data that may be useful in some respect, and any other relevant information or functional possibilities. Preferably, upon an indication by a user or upon a pre-defined system event (for example, expiration of a timer), the user is directed along path 122 to Content Detail Screen 123.

At Search Results Screen 120, a user can view and select from a subset of data retrieved in accordance with criteria defined by the user while viewing Advanced Search Screen 107 and possibly in accordance with one or more database enforced criteria. Upon indicating a selection of one or more assets, a user is directed along path 121 to Content Detail Screen 123.

In addition to being directed along path 121 or 122 as described, a user may be directed along path 124 from any of screens 109, 111, or 113 to Content Detail Screen 123. A user may be automatically directed to screen 123 if a small number of asset definitions are the only items the user wishes to view. For instance, if a user performs a complex search and the system finds only one asset satisfying the search criteria, the system may automatically bypass Search Results Screen 120 and display Content Detail Screen 123.

At Content Detail Screen 123, a user can view all or part of the summary data directly related to one or more items selected manually or automatically by the user. Preferably, upon an indication by the user or upon a pre-defined system event (for example, expiration of a timer), a user is directed along path 125 to Order Options Screen 126.

At Order Options Screen 126, a user can view and select from options related to ordering and downloading data for which summary data was viewed while viewing Content Detail Screen 123. These options may include billing, routing, formatting, data transmission, delivery date, delivery time, and other relevant options. Upon indication by a user or upon a pre-defined system event, the user is directed along path 127 to Login Screen 103 or along path 128 to Order Confirmation And Download Screen 117. Preferably, a user is directed along path 127 when the user has not logged in using Login Screen 103. Alternatively, a user is directed along path 128 when the user had previously logged in via Login Screen 103. In some systems, logging in is not necessary. In other systems, a user that has logged in but has not taken any decisive action (for instance, has not made an indication at Order Options Screen 126 within a specified amount of time after logging in) is directed along path 127.

At Order Confirmation And Download Screen 117 the system preferably displays details and summary information relating to an asset that was ordered by a user. The user is preferably presented with the opportunity to download or retrieve the asset. Such retrieval may be performed either electronically or by using devices (such as printers, tape recorders, compact disc writers, digital video disc writers, or other recording or printing equipment) to convert an asset stored in a database or in an associated or networked computer memory to a digital or analog item stored in another manner.

Note that any of paths 102, 104, 106, 108, 110, 112, 114, 116, 118, 119, 121, 122, 124, 125, or 128 may be traversed in reverse by users that wish to step backwards in the search and ordering process. Also, securing the search system is not a necessary function of the invention. Note further that all of interface 100 is not necessary for implementing the invention; an interface employing even a very small subset of interface 100 can benefit from the invention. Moreover, additional process paths and functionality (for instance, paths connecting any of screens 109, 111, 113, 115, and 123 directly to Search Results Screen 120 to allow a user to view search results from a search performed while viewing any of those screens) can be added to interface 100.

In sum, the data definitions of the invention enable systems using interface 100 or similar interfaces to provide satisfactory interactive search and response times to users.

Figure 2:
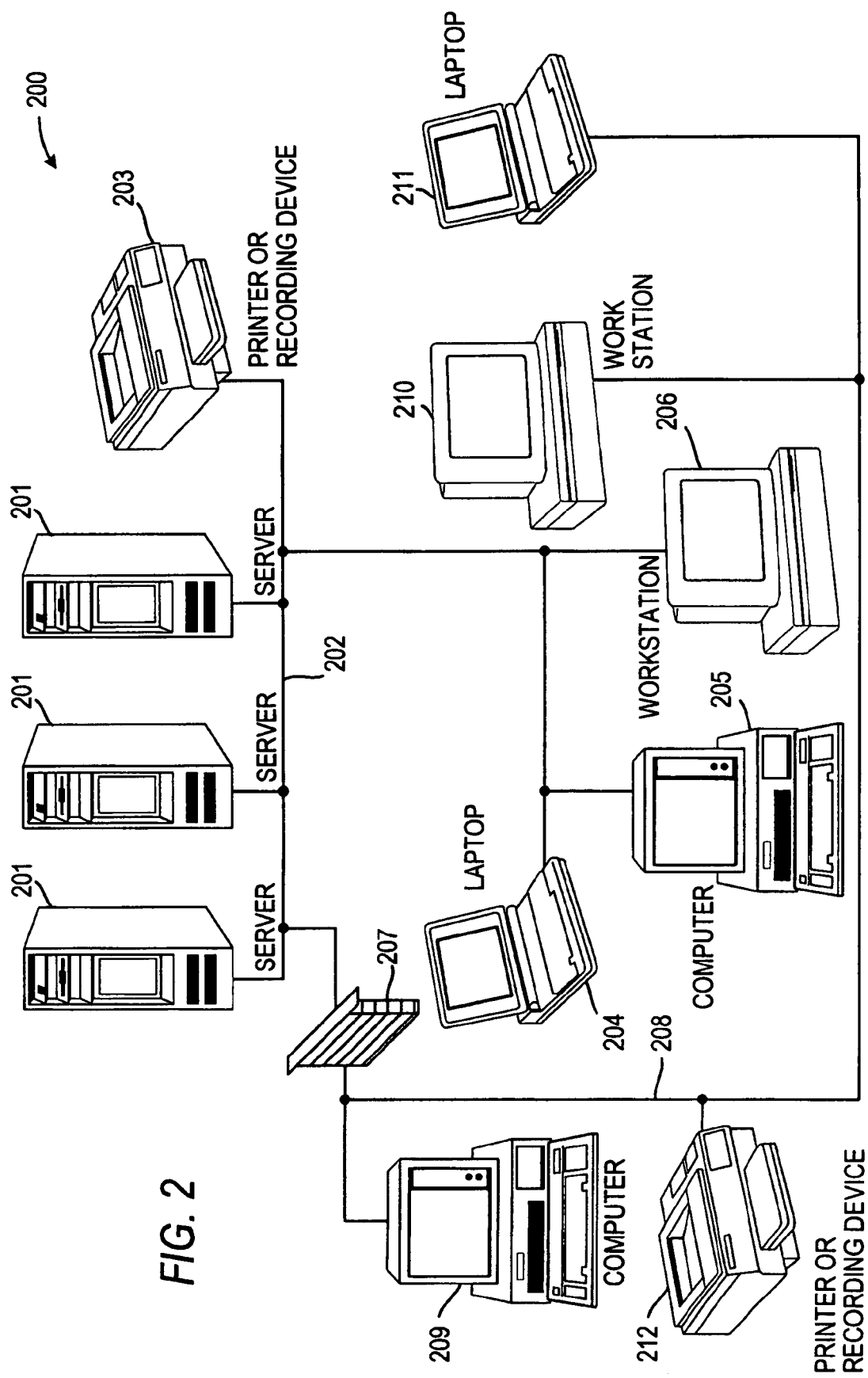
FIG. 2 is a block diagram of an embodiment of a hardware system within which the invention can be used.

FIG. 2 shows a hardware system 200 that can be used to manage digital data defined with data definitions in accordance with the invention. System 200 preferably includes one or more servers 201, a secure transmission line 202, at least one secure recording or printing device 203, one or more secure access devices (e.g., laptop 204, computer 205, and workstation 206), at least one firewall 207, one or more non-secure transmission lines 208, one or more non-secure access devices (e.g., computer 209, workstation 210, and laptop 211), and at least one non-secure recording or printing device 212.

One or more servers 201 store all or part of one or more databases. Servers 201 may be accessed via secure transmission line 202 by secure access devices 204-206 or by firewall 207 which has received appropriate indications from non-secure access devices 209-211 via non-secure transmission line 208. Upon receiving appropriate indications from devices 204-206 or firewall 207, servers 201 transmit data to devices 204-206, firewall 207, or recording or printing device 203, as appropriate, via secure transmission line 202.

Upon receiving appropriate indications (based on security criteria), firewall 207 transmits data to non-secure access devices 209-211 or non-secure recording or printing device 212, as appropriate, via non-secured data transmission line 208.

Secure access devices 204-206 and non-secure access devices 209-211 can include laptop computers, desktop computers, and workstations (as shown), as well as other types of terminals, wireless devices, personal digital assistants (PDAs), television set-top boxes, other databases, and other digital devices that can receive user indications and can communicate with servers or firewalls.

Severs 201 can be, for example, Sun® servers using the Solaris® platform, Oracle® database servers, or any other appropriate server platform. Transmission lines 202 and 208 may use T-1, T-2, or any other appropriate transmission standards. Alternatively, the invention can be practiced with a configuration as simple as a single computer that can do the following: store and query a database in its RAM, ROM, hard disk drive, compact disc, floppy disk, or other suitable storage medium; display visual or play audio content; and receive user indications.

Figure 3:
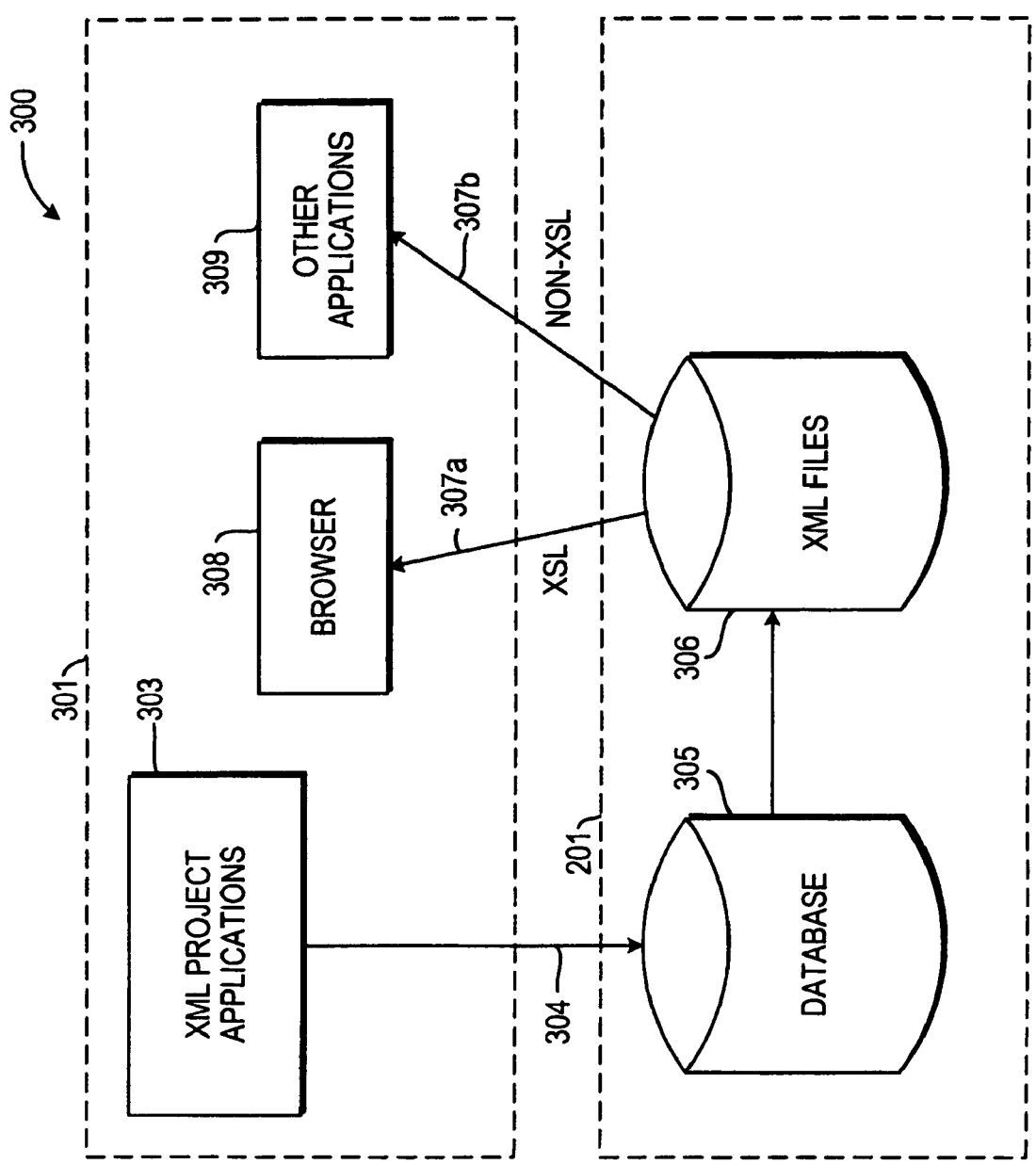
FIG. 3 is a block diagram of an embodiment of integrated software according to the invention.

FIG. 3 shows an embodiment of integrated software according to the invention. Computer 301 (which may be any of secure access devices 204-206, firewall 207, and non-secure access devices 209-211) communicates with servers 201. Project applications 303, which are preferably encoded in XML, transmit a demand 304 for database information to database 305. Database 305 may be, for example, Oracle®, Sybase®, Microsoft Access®, or any other relational or non-relational database package. Database 305 creates preferably XML files 306. An example of an XML file 306 is shown in Example 2 below. XML files 306 are transmitted in HTML format 307a for viewing graphics with a browser 308. Microsoft Internet Explorer® and Netscape Navigator® are two examples of browsers that may be used. Preferably, format 307a is HTML with cascading style sheets (CSS).

Alternatively, XML files 306 may be transmitted in XML format 307b for use by other applications 309, such as, for example, C, C++, or Java applications that may be for a stand-alone screen, front-end GUI, or Web presentation package. Alternative format 307b may include XML with CSS for further processing by applications such as search engines or bots or may include regular HTML if a still or active display is the only output requirement. Bots are programs that typically perform repetitive or time consuming tasks on a network (e.g., searching Web sites on the Internet). Examples of formats 307a and 307b are shown below in Examples 3a-c.

Figure 4:
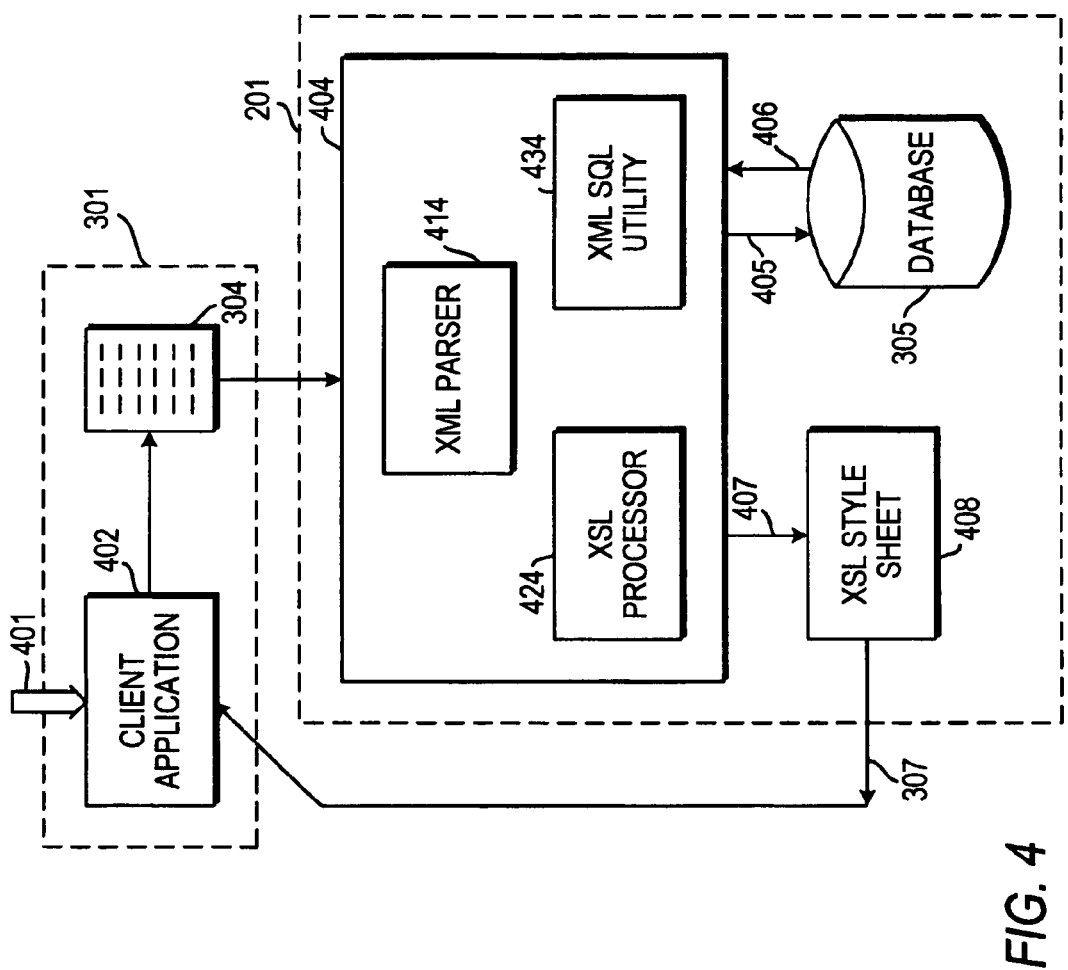
FIG. 4 is a block diagram of an embodiment of an application interface configuration according to the invention.

FIG. 4 shows an embodiment of an application interface configuration in accordance with the invention. In this configuration, a user provides search parameters 401 to client application 402, which is active on computer 301. Client application 402 converts search parameters 401 into a demand 304 for database information. Demand 304 may take the form of an SQL (structured query language) query when database 305 is an SQL-based relational database. Preferably, however, server 201 processes demand 304 in a server application 404. Server application 404 preferably includes the following modules: an XML parser 414, an XSL processor 424, and an XML-SQL utility 434. XSL (extensible style sheet language) is a language for specifying style sheets that apply formatting to complex XML data for presentation in HTML and other formats. XSL can map a single XML element to more than one type of display object (e.g., both an element in a list and an item in a table). A style sheet is a text file containing code to apply semantics such as page layout specifications to an HTML document.

After converting demand 304 to SQL format (if necessary depending on the database), application 404 sends query 405 to database 305. Database 305 processes query 405 and returns search results 406 to application 404. Application 404 then processes results 406 to create one or more XML files. These XML files are sent by application 404 as data 407 to XSL style sheet 408. XSL style sheet 408 processes data 407 and returns a response 307 in format 307a or 307b, as appropriate. Client application 402 then converts response 307 into a format that can be heard or viewed by the user.

Figure 5:
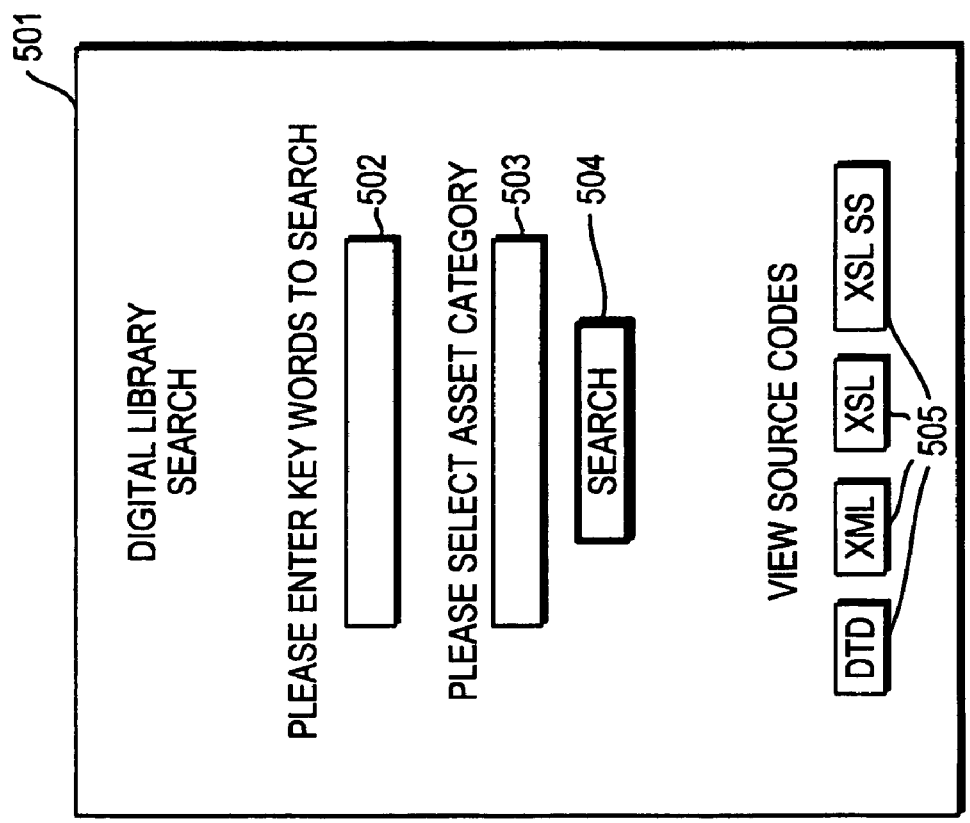
FIG. 5 shows an embodiment of a display screen for asset searching according to the invention.

FIG. 5 shows an example of a display that can be used as Advanced Search Screen 107. Illustrative display 501 includes interactive features 502, 503, 504, and 505. Display 501 may alternatively include more or less interactive features as appropriate for a given implementation of the invention. Interactive feature 502, entitled "PLEASE ENTER KEYWORDS TO SEARCH," accepts user entries of keywords or phrases to be used by XML project applications 303 when forming demand 304. For example, "Oscar belt" may be entered via interactive feature 502 by a user searching for a picture that has metadata containing the description, "Oscar Delahoya wearing a championship belt." Interactive feature 503, entitled "PLEASE SELECT ASSET CATEGORY," accepts user entries for the type of asset to retrieve. For example, possible asset types are photos, audio, video, text, any combination of these, or any other appropriate asset type. Interactive feature 504, entitled "SEARCH," allows users to submit a search request (i.e., have application 303 form a demand 304). Interactive features 505, entitled "DTD," "XML," "XSL," and "XSL SS," allow a user to select a source code format in which to view data instead of viewing a composed video screen or hearing a composed audio output.

Figure 6:
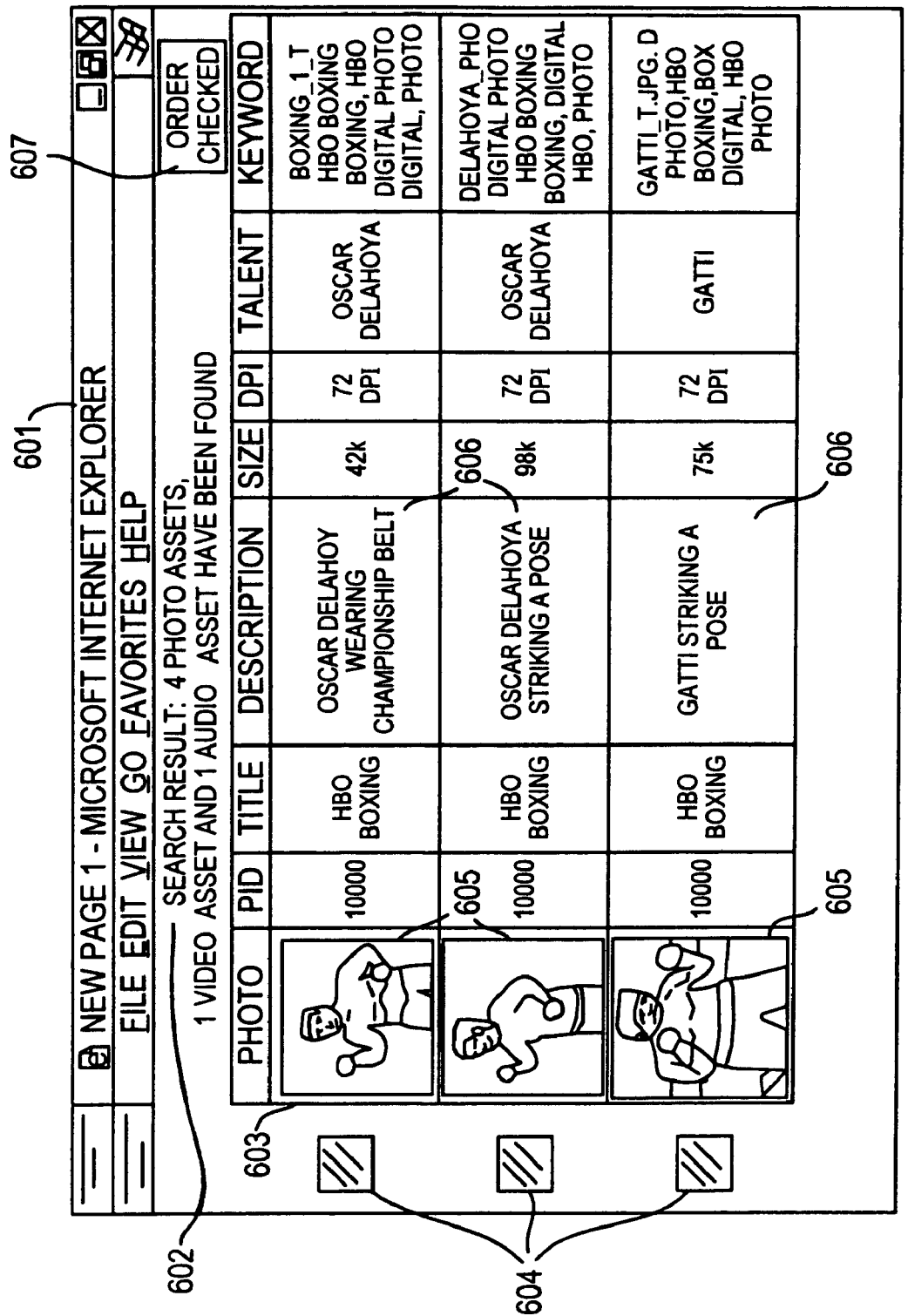
FIG. 6 shows an embodiment of a display screen for search results according to the invention.

FIG. 6 shows an example of a display that can be used as Search Results Screen 120. In this example, illustrative display 601 indicates at 602 that 4 photo assets, 1 video asset, and 1 audio asset had been found, and shows at 603 a list of photographic assets, that met the criteria of a demand 304. Illustrative display 601 preferably includes features 604, 605, 606, and 607. Alternatively, display 601 can include more or less features as desired for a given implementation of the invention. Features 604 interactively accepts user indications of selection or rejection of assets from the displayed list of assets. Features 605 may be interactive (e.g., a button) or static (e.g., just a display). In this example, feature 605 displays an image of the assets associated with the retrieved list items. If feature 605 is interactive, it can accept a user's selection of an asset to be ordered. Feature 606 displays descriptive information associated with the assets that met the criteria of demand 304. Feature 606, like feature 605, may be interactive to accept user selections of an asset. Feature 607, entitled "ORDER CHECKED," is interactive and accepts indications that a user has finished selecting assets and is ready to proceed along path 121 to Content Detail Screen 123.

Figure 7:
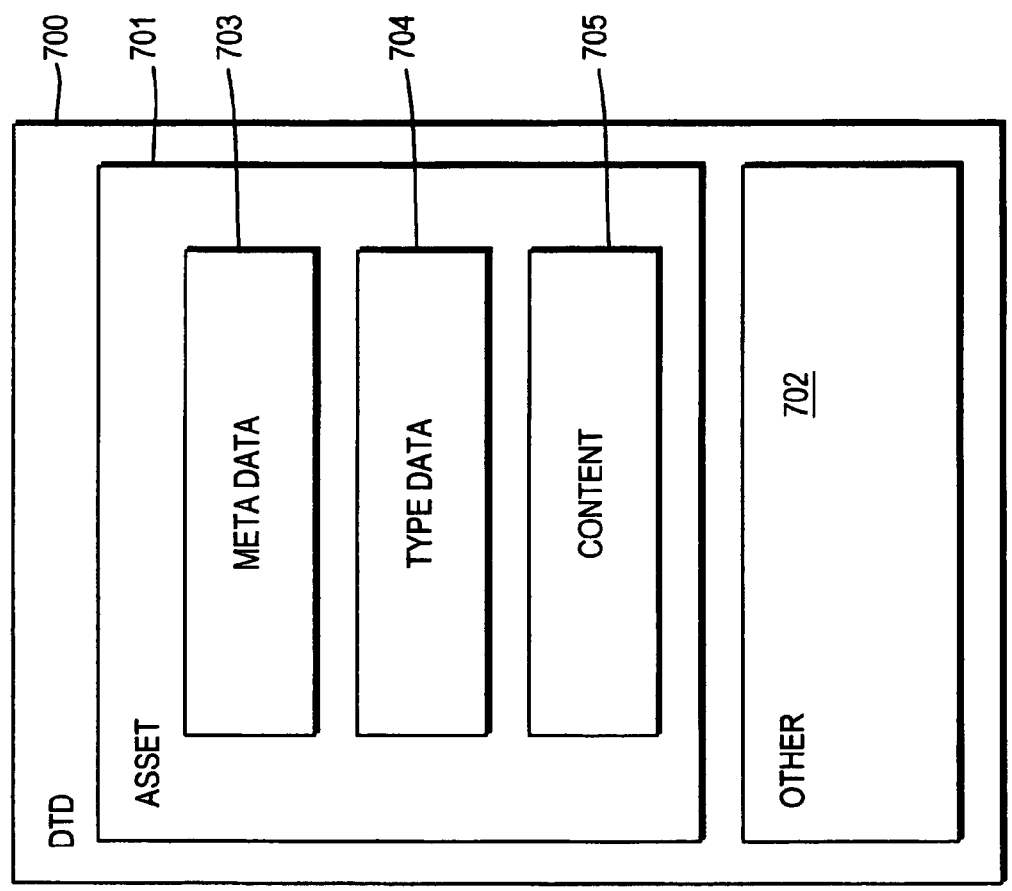
FIG. 7 is a high level block diagram showing an embodiment of a document type definition (DTD) for digital assets according to the invention.

FIG. 7 shows an embodiment of a document type definition (DTD) in accordance with the invention. A DTD is a separate file or document that contains formal definitions of all the data elements in a particular type of XML (or HTML or SGML) document, such as a report or a book. By consulting the DTD for a document, a program called a parser (e.g., XML parser 414) can work with the markup codes that the document contains. DTD 700 includes asset element 701, which defines the type of data to be stored for each digital asset. DTD 700 may also include one or more other data elements 702 for other uses. For example, asset element 701 can contain a core set of definitions, while data element 702 can contain additional definitions that augment the core set in cases where such additional definitions are required by a particular user.

Asset element 701 preferably includes asset metadata 703, asset type data 704, and asset content 705. Asset element 701 may also include additional definitional information as desired. Asset metadata 703 preferably includes the following definitional elements: product identifier (ID) (e.g., a video program name), version ID, inventory ID, and ownership rights ID. Asset metadata 703 can also include any subset of these identifiers or any additional identification information.

Asset type data 704 advantageously can include any number of definitional elements relevant to a particular type of asset. Table 1 is a preferred embodiment of asset type data 704 in accordance with the invention, showing definitional elements for classifying five asset types:

TABLE 1

| | | ASSET TYPE | | | | |
|---|---|---|---|---|---|---|
| | | Photo | Movie | Audio | Promo | Voiceovers |
| Metadata | | Ad Slick | Version | Music | On-Line edit | Announcer |
| | | Agency | Rating | Stock | Airmaster # | Session Date |
| | | Approved | Minutes | Library | EE Master # | 1st air date |
| | | Archive | Seconds | Sub Library | Textless # | Residual payment |
| | | Art Director | Date | CD # | Writer/Producer | Production company |
| | | Black/White | AKA Title | CD Title | Duration | Agency |
| | | Box ID | Type | Track Title | Music | Telephone # |
| | | Caption | Genre | Duration | Announcer | Fed ID# |
| | | Character | Caption | Composer | Cut versions | Address |
| | | Client | Title | Publisher | Graphics | |
| | | Color | Licensor | Society | Promo Dub | |
| | | Comments | Release Date | | Shoot Material | |
| | | Discard Date | Rating | Original Code | EPK | |
| | | Entry Date | Foreign Lang. | | Trailer | |
| | | Storage Date | Run Time | Title | Kill Date | |
| | | Department | Color/BW | Duration | Comments | |
| | | Final art | Director | Session DT | DAT | |
| | | Job number | Cast | Composer | Script | |
| | | Licensor | Brief Synopsis | Publisher | EDL | |
| | | Off-site storage | P Version Format | Society | Screening notes | |
| | | Photographer | Synopsis | Rights Issues | Internet rights | |
| | | Product ID | Product ID | Contract (lic.) | | |
| | | Poster Art | Version ID | Internet | | |
| | | Press Kit | Contract ID | International | | |
| | | Version ID | Run code | Library Contact | | |

TABLE 1-continued

| | | ASSET TYPE | | |
|---|---|---|---|---|
| Photo | Movie | Audio | Promo | Voiceovers |
| Project | SAP | | | |
| Number | | | | |
| Resolution | | | | |
| Restrictions | | | | |
| Shoot date | | | | |
| Talent | | | | |
| Title | | | | |

Note that the elements defined in Table 1 are illustrative and thus are neither required nor exclusive of other elements.

Asset content 705 preferably includes one of the following: digitally encoded asset data, a link to a file containing asset data, or a reference to a location where asset data is digitally stored. Alternatively and less preferable, multiple copies of a digital asset can be referenced or included in asset content 705.

An embodiment of DTD 700 for digital assets, which includes asset element 701, asset metadata 703, asset type data 704, and asset content 705, is shown below in Example 1 in accordance with the invention.

EXAMPLE 1

<! -DTD FOR DIGITAL ASSETS ->
<! -Digital Library Data Definition ->
<! -Supporting technologies include but not limited to XML, XSL, XSLT, XPATH, DTD Schema->

| | | | | |
|---|---|---|---|---|
| <!ELEMENT | digitalAsset (assetMetadata, movieTitleMetadata?, rightsMetadata, transactionMetadata?, Photo*, Promo*, Audio*, Movie*,)> | | | |
| <!ELEMENT | assetMetadata (#PCDATA)> | | | |
| <! ATTLIST | assetMetadata | | | |
| AssetTitle | CDATA | #IMPLIED | -this asset package has a name- | |
| AssetComments | CDATA | #REQUIRED | -comments/description about the asset group- | |
| AssetVersion | CDATA | #REQUIRED | -version, major + minor- | |
| AssetCreateDate | CDATA | #REQUIRED | -create date- | |
| > | | | | |
| <!ELEMENT | movieTitleMetadata (#PCDATA)> | | | |
| <! ATTLIST | movieTitleMetadata | | | |
| PID | CDATA | #REQUIRED | -product id; link to PRIME.PPROD- | |
| VID | CDATA | #REQUIRED | -PEG--version id; LINK TO prime/pversion_general- | |
| RID | CDATA | #REQUIRED | -rights id, for FUTURE use- | |
| Genre | CDATA | #REQUIRED | -PEG genre, may be several genres [ ] FUT make multiple elements?- | |
| Rating | CDATA | #REQUIRED | -PEG MPAA information- | |
| movieTitleLong | CDATA | #REQUIRED | -PEG the movie title, full name with all punctuation- | |
| movieTitleShort | CDATA | #REQUIRED | -PEG abbreviated movie title, suitable for computer filenames; no blanks, special chars- | |
| movieTitleAKA | CDATA | #IMPLIED | -alternate movie name; different countries- | |
| StudioProvider | CDATA | #IMPLIED | -PEG--copyright owner or provider of tape- | |
| Director | CDATA | #REQUIRED | -PEG--movie director- | |
| Cast | CDATA | #REQUIRED | -PEG cast members, talent [ ] FUT make multiple elements?- | |
| SynopsisBrief | CDATA | #REQUIRED | -PEG short description- | |
| SynopsisLong | CDATA | #REQUIRED | -full description- | |
| Languages | CDATA | #REQUIRED | -PEG languages; may be several on many tracks; [ ] FUT make multiple elements?- | |
| movieComments | CDATA | #REQUIRED | -transmission commentary information- | |
| movieCreateDate | CDATA | #REQUIRED | -PEG needs year creation date- | |
| movieRun_Time | CDATA | #REQUIRED | -PEG hh:mm- | |
| movieRun_Time-Status | CDATA | #REQUIRED | -estimated or actual- | |
| movieRunTimeMinutes | CDATA | #IMPLIED | -RunTime minutes- | |
| movieRunTimeSeconds | CDATA | #IMPLIED | -RunTime seconds- | |
| Run_Code | CDATA | #IMPLIED | -(ex. 2:02 HA)- | |
| Run_Code_Type | CDATA | #IMPLIED | -can include codes indicating type of encoding etc.- | |
| Color/BW | CDATA | #IMPLIED | -black & white or color- | |
| Caption | CDATA | #IMPLIED | -caption or description information- | |
| Keywords | CDATA | #IMPLIED | -digital library query data for file retrieval- | |

-continued

```
>
<!-Rights Management Structure->
<!ELEMENT               rightsMetadata
                        (#PCDATA)>
<! ATTLIST              rightsMetadata
CID                     CDATA              #REQUIRED    -contract id-
Amend_No                CDATA              #IMPLIED     -contract amendment number-
Ravi_ID                 CDATA              #IMPLIED     -rights availability window id-
Start_Date              CDATA              #IMPLIED     -PEG start of availability-
End_Date                CDATA              #IMPLIED     -PEG end of availability-
No_of_Plays             CDATA              #IMPLIED     -allowed number of plays per agreement-
Usage_Allowed           CDATA              #IMPLIED     -extra restrictions (ex. Rewind, pause, fast
                                                         forward)-
Fee                     CDATA              #IMIPLIED    -transaction fee-
Authorized_Zone         CDATA              #IMPLIED     -geography or person-
World_Wide_Rights       CDATA              #IMPLIED     -yes or no-
Music_Effects           CDATA              #IMPLIED     -yes or no (ex. train crash, explosion)-
Licensor                CDATA              #IMPLIED     -copyright holder-
Coypright_Year          CDATA              #IMPLIED     -year of copyright-
>
<!-Transaction Metadata Structure->
<!ELEMENT               transactionMetadata
                        (#PCDATA)>
<! ATTLIST              transactionMetadata
Trans_ID                CDATA              #REQUIRED    -transaction id-
Trans_Type              CDATA              #IMPLIED     -type of transaction-
Trans_Date              CDATA              #IMPLIED     -date of transaction-
Trans_User_ID           CDATA              #IMPLIED     -transaction author-
>
<!-Digital Photo Metadata Structure->
<!ELEMENT               Photo (photoMetadata,
                        transactionMetadata)>
<!ELEMENT               photoMetadata
                        (#PCDATA)>
<! ATTLIST              photoMetadata
<!-Baseline Information-Required fields->
BID                     CDATA              #REQUIRED    -base ID-
Form_DigitalAsset       CDATA              #REQUIRED    -photographs, graphics, location stills, or
                                                         royalty fee-
Orig Creation Date      CDATA              #REQUIRED    -original creation date of digital photo
                                                         asset (date field)-
Resolution Type         CDATA              #REQUIRED
<!-Production Information (extracted from PRIME)->
Film/Series/Program_Title  CDATA           #IMPLIED     -program title associated with photograph-
Orig Broadcast Date     CDATA              #IMPLIED     -original broadcast date of film or series
                                                         (date field extracted from PRIME)-
Orig Broadcast Season   CDATA              #IMPLIED     -original broadcast season of program or
                                                         series-
Orig Release Date       CDATA              #IMPLIED     -original release date of program or series-
Film/Series_Creation Date  CDATA           #IMPLIED     -original creation date of film or series
                                                         (date field)-
Original Copyright Year CDATA              #IMPLIED     -copyright year (date field-
Film/Series_Version     CDATA              #IMPLIED     -version control information-
Film/Series_Origin      CDATA              #IMPLIED     -origin of film or series (e.g. HBO
                                                         Theatrical)-
Description_Blurb       CDATA              #IMPLIED     -description information extracted from
                                                         PRIME-
Form_Program            CDATA              #IMPLIED     -program type (e.g. Movie)-
Genre                   CDATA              #IMPLIED     -program style (e.g. Romance, Drama,
                                                         Comedy)-
Rating                  CDATA              #IMPLIED     -program rating (e.g. R, PG)-
FilmSeries_Director     CDATA              #IMPLIED     -director of film or series-
Film/Series_Writer      CDATA              #IMPLIED     -writer of film or series-
Film/Series-Producer    CDATA              #IMPLIED     -producer of film or series-
Film/Series_Cast Talent CDATA              #IMPLIED     -film or series cast and talent information-
FilmSeries_Production   CDATA              #IMPLIED     -production executive-
Executive
Film/Series Programming CDATA              #IMPLIED     -programming executive-
Executive
<!-Photograph Content Information->
Cast/Talent_Photo       CDATA              #IMPLIED     -cast or talent that appear in photograph-
Crew Name_Photo         CDATA              #IMPLIED     -crew that appear in photograph-
Crew Position_Photo     CDATA              #IMPLIED     -crew position (e.g. Director, Producer,
                                                         Writer)-
Origin_Photo            CDATA              #IMPLIED     -origin of photo (e.g. Warner Brothers,
                                                         United Artist, Sports Illustrated)-
Agency                  CDATA              #IMPLIED     -creative agency information-
Art Director_Photo      CDATA              #IMPLIED     -Art Director information-
Photographer            CDATA              #IMPLIED     -Photographer information-
```

-continued

| | | | |
|---|---|---|---|
| Requesting Department | CDATA | #IMPLIED | -division requesting digital content- |
| Request Date | CDATA | #IMPLIED | -date of request for digital asset (date field)- |
| <!-Physical Photograph Information-> | | | |
| Orig Photo ID | CDATA | #IMPLIED | -barcode information from photo label |
| Orig Photo Medium | CDATA | #IMPLIED | -(e.g. negative, print, transparency)- |
| Orig Photo Location | CDATA | #IMPLIED | -location of photo in physical archive- |
| Orig Photo Archive Date | CDATA | #IMPLIED | -original archive date of photo (date field)- |
| Orig Photo Archive Box Number | CDATA | #IMPLIED | -original box number from physical file- |
| <!-General Information-> | | | |
| DID | CDATA | #IMPLIED | -digital asset id. link to Artesia UO!__ID__ |
| Shoot Type | CDATA | #IMPLIED | -type of photographic shoot (e.g. gallery, location still, acquisition)- |
| Color | CDATA | #IMPLIED | -color space of digital photo (e.g. black & white color)- |
| Description | CDATA | #IMPLIED | -description of digital photograph subject matter- |
| Comments | CDATA | #IMPLIED | -general comments- |
| Ready for Rights | CDATA | #IMPLIED | -yes or no- |
| Input Date | CDATA | #IMPLIED | -date of ingestion into Digital Library system (date field)- |
| Input By | CDATA | #IMPLIED | -name of person responsible for uploading asset into Digital Library- |
| Last Updated Date | CDATA | #IMPLIED | -date of last update or modification (date field)- |
| Last Updated By | CDATA | #IMPLIED | -person responsible for last update or modification- |
| <!-Rights Information-> | | | |
| Asset Copyright Year | CDATA | #IMPLIED | -digital asset year of copyright- |
| Asset Copyright Holder | CDATA | #IMPLIED | -digital asset copyright holder- |
| Restrictions__Legal | CDATA | #IMPLIED | -legal restrictions associated with digital asset- |
| Restrictions__Photographer | CDATA | #IMPLIED | -photographer restrictions associated with digital asset- |
| Restrictions__Exclusives | CDATA | #IMPLIED | -yes or no- |
| Exclusives Held Until | CDATA | #IMPLIED | -expiration of exclusive condition linked to digital asset (date field)- |
| Restrictions__License Limitations | CDATA | #IMPLIED | -licensing limitations or restrictions associated to digital asset- |
| Legal Contact | CDATA | #IMPLIED | -legal contact for information regarding digital content usage- |
| Availability End Date | CDATA | #IMPLIED | -date when digital asset is no longer available for usage (date field)- |
| Rights Input Date | CDATA | #IMPLIED | -date digital rights entered into Digital Library system (date field)- |
| Rights Input By | CDATA | #IMPLIED | -person entering digital rights info into Digital Library system- |
| Rights Last Updated Date | CDATA | #IMPLIED | -date rights information was last upgraded or modified (date field)- |
| Rights Last Updated By | CDATA | #IMPLIED | -person responsible for last update or modification of rights info- |
| <!-Digital Photograph Information-> | | | |
| Filename | CDATA | #IMPLIED | -name of digital file assigned by scanning technician (e.g. sopranos.jpg)- |
| Format | CDATA | #IMPLIED | -file format (e.g. JPEG, TIFF, PPT)- |
| Physical Location | CDATA | #IMPLIED | -archival location of original transparency or print- |
| Server Location | CDATA | #IMPLIED | -location of digital asset storage system- |
| Digitizing Date | CDATA | #IMPLIED | -date digital asset was scanned (date field)- |
| Creator | CDATA | #IMPLIED | -name of person creating the digital file (e.g. scanning technician)- |
| Filesize | CDATA | #IMPLIED | -size of digital file (KB/MB)- |
| Mode | CDATA | #IMPLIED | -color space (e.g. RGB, CMYK, Grayscale)- |
| Height__Inches | CDATA | #IMPLIED | -height of digital image (inches)- |
| Width__Inches | CDATA | #IMPLIED | -width of digital image (inches) |
| Height__Pixels | CDATA | #IMPLIED | -height of digital image (pixels)- |
| Width (Pixes10 | CDATA | #IMPLIED | -width of digital image (pixels)- |
| Resolution__DPI | CDATA | #IMPLIED | -digital image resolution (dots per inch) |
| > | | | |
| <!-Digital Audio Metadata Structure-> | | | |
| <!ELEMENT | Audio (audioMetadata, transactionMetadata)> | | |
| <!ELEMENT | audioMetadata (#PCDATA)> | | |
| <!ATTLIST | audioMetadata | | |
| AID | CDATA | #REQUIRED | -asset id- |

-continued

| | | | |
|---|---|---|---|
| PID | CDATA | #REQUIRED | -product ID- |
| CID | CDATA | #REQUIRED | -contract id- |
| Title | CDATA | #IMPLIED | -audio title- |
| Music | CDATA | #IMPLIED | -yes or no- |
| Stock | CDATA | #IMPLIED | -yes or no- |
| Stock_Library | CDATA | #IMPLIED | -music library information- |
| Stock_Sub_Library | CDATA | #IMPLIED | -audio library tracking information- |
| Stock_CD_Nbr | CDATA | #IMPLIED | -CD ID number- |
| Stock_CD_Title | CDATA | #IMPLIED | -CD title information- |
| Stock_Track_Title | CDATA | #IMPLIED | -audio track information- |
| Stock_Duration | CDATA | #IMPLIED | -length of media section- |
| Stock_Composer | CDATA | #IMPLIED | -music composer information- |
| Stock_Publisher | CDATA | #IMPLIED | -publishing party (ex. Warner, etc.)- |
| Stock_Society | CDATA | #IMPLIED | -(ex. ASCAP, etc.)- |
| Original | CDATA | #IMPLIED | -yes or no- |
| Original_Code | CDATA | #IMPLIED | -x- |
| Original_Session_Date | CDATA | #IMPLIED | -date of recording- |
| Original_Composer | CDATA | #IMPLIED | -music composer information- |
| Original_Publisher | CDATA | #IMPLIED | -party of publisher (ex. Warner, etc.)- |
| Original_Society | CDATA | #IMPLIED | -x- |
| Rights_Issues | CDATA | #IMPLIED | -contract information (ex. Rights, Permissions)- |
| Contract_License | CDATA | #IMPLIED | -yes or no- |
| Internet | CDATA | #IMPLIED | -yes or no- |
| International | CDATA | #IMPLIED | -yes or no- |
| Library_Contact | CDATA | #IMPLIED | -contact person- |
| > | | | |
| <!-Long Form Movie Metadata Structure-> | | | |
| <!ELEMENT | Movie (movie_FormatMetadata, TransactionMetadata)> | | |
| <!ELEMENT | movie_FormatMetadata (#PCDATA)> | | |
| <! ATTLIST | movie_FormatMetadata | | |
| SAP | CDATA | #IMPLIED | -yes or no; secondary audio program (ex. Spanish)- |
| P_Version_Format | CDATA | #IMPLIED | -refers to the format information (PRIME Table)- |
| Transmission_Format | CDATA | #REQUIRED | -digital format (ex. MPEG, Quicktime, etc.)- |
| Storage_Capacity | CDATA | #IMPLIED | -storage requirements for digital transmission data- |
| Unit_of_Measure_of_Capacity | CDATA | #IMPLIED | -(ex. Megabytes MB, Gigabytes GB, Terabytes TB)- |
| Compression_Status | CDATA | #REQUIRED | -bit rate information- |
| ESP | CDATA | #REQUIRED | -yes or no- |
| Closed_Caption | CDATA | #IMPLIED | -yes or no- |
| Sound | CDATA | #IMPLIED | -(ex. Stereo, Mono, Dolby, Dolby Digital, Dolby)- |
| > | | | |

Example 2 below shows a sample XML document generated as part of a photographic asset search.

EXAMPLE 2

(filename: sample.xml)

```
<?xml version='1.0' standalone='no'?>
<DAL>
<Asset>
<Assetmetadata PID="200000" AssetTitle="Chaos Factor"
Comments="Soldiers talking to man">
</Assetmetadata>
<Photo>
<Photometadata Resolution="72 dpi"
    Talent="Unknown">
  </Photometadata>
 </Photo>
<Content>chaos_1_t.jpg
</Content>
</Asset>
<Asset>
<Assetmetadata PID="141896" AssetTitle="If walls could
talk 2" Comments="An HBO Films trilogy examining the
```

-continued (filename: sample.xml)

```
lesbian experience in America in three different decades">
</Assetmetadata>
<Photo>
<Photometadata Resolution="72 dpi" Talent="Ellen Degeneres">
</Photometadata>
</Photo>
< Content>walls_2_t.jpg
</Content>
</Asset>
<Asset>
<Assetmetadata PID="300000" AssetTitle="Sex and the city"
Comments="Close up portrait of Sarah JessicaParker">
</Assetmetadata>
<Photo>
<Photometadata Resolution="72 dpi" Talent=Sarah and cast">
</Photometadata>
</Photo>
<Content>sex_sity_2_t.jpg
</Content>
</Asset>
<Asset>
<Assetmetadata PID="141897" AssetTitle="If walls could
talk 2" Comments=" An HBO Films trilogy examining the
```

-continued (filename: sample.xml)

```
lesbian experience in America in three different decades">
</Assetmetadata >
<Photo>
<Photometadata Resolution="72 dpi" Talent="Ellen Degeneres">
</Photometadata>
</Photo>
< Content>walls__5__t.jpg
</Content>
</Asset>
</DAL>
```

XSL operates on XML search output. The output from XSL may be either HTML or XML both with CSS. Known software engines, such as, for example, a software engine known as XT developed by James Clark (see http://jclark.com/xml/xt.html for more details), can be used to convert XML into HTML. A sample command for doing such is: C:>XT sample.xml css.xsl output2.xml. This command generates an XML document named output2.xml, which can be displayed using standard browser software.

Example 3a shows a sample XSL script. Example 3b shows a sample HTML document generated by XSL on the XML search output of Example 2. Example 3c shows a sample XML document with CSS also generated by XSL on the XML search output of Example 2.

EXAMPLE 3a

```
<?xml version="1.0"?>
<xsl:stylesheet version="1.0"
xmlns:xsl="http://www.w3.org/1999/XSL/Transform">
<xsl:template match="/">
<xsl:apply-templates/>
</xsl:template>
</xsl:template match="/DAL/Asset">
<TABLE WIDTH="100%" BORDER="1"><TR><TD HEIGHT="288">
<B>PID:</B><xsl:value-of select-Assetmetadata/@PID/><BR/>
<B>Asset Title: </B><xsl:value-of
select="Assetmedatada/@AssetTitle"/><BR/>
<B>Comments:</B><xsl:value-of
select="Assetmetadata/@Comments"/><BR/>
<B>Resolution:</B><xsl:value-of
select="Photo/Photometadata/@Resolution"/><BR/>
<B>Talent:</B><xsl:value-of
select="Photo/Photometadata/@Talent"/><BR/>
</TD><TD WIDTH="288" HEIGHT="288">
<xsl:apply-templates />
</TD></TR>
</TABLE>
</xsl:template>
<xsl:template match="/DAL/Asset/Content">
<P><A
href="{concat('full__',ancestor::Asset/Content)}"><img
src="{ancestor::Asset/Content}" border="0"/>
</A></P>
</xsl:template>
</xsl:stylesheet>
```

EXAMPLE 3b

```
<HTML>
<TABLE WIDTH="100%" BORDER="1"><TR>
<TD HEIGHT="288">
<B>PID: </B>200000<BR/>
<B>Asset Title:</B>Chaos Factor<BR/>
<B>Comments:</B>Soldiers talking to man<BR/>
<B>Resolution:</B> 72 dpi<BR/>
<B>Talent:</B>Unknown<BR/>
</TD><TD WIDTH="288" HEIGHT="288">
<P><A href="full__chaos__1__t.jpg"><img
src="chaos__1__t.jpg" border="0"/></A></P></TD>
</TR></TABLE>
<TABLE WIDTH="100%" BORDER="1"><TR>
<TD HEIGHT="288">
<B>PID: </B>141896<BR/>
<B>Asset Title:</B>lf walls could talk 2<BR/>
<B>Comments:</B>An HBO Films trilogy examining the lesbian
experience in America in three different decades<BR/>
<B>Resolution:</B> 72 dpi<BR/>
<B>Talent:</B>Ellen Degeneres<BR/></TD>
<TD WIDTH="288" HEIGHT="288">
<P><A href="full__walls__2__t.jpg"><img
src="walls__2__t.jpg" border="0"/> </A></P></TD>
</TR></TABLE>
<TABLE WIDTH="100%" BORDER="1"><TR>
<TD HEIGHT="288"><B>PID: </B>300000<BR/>
<B>Asset Title:</B>Sex and the city<BR/>
<B>Comments:</B>Close up portrait of Sarah Jessica Parker<BR/>
<B>Resolution:</B> 72 dpi<BR/>
<B>Talent:</B>Sarah and cast<BR/></TD>
<TD WIDTH="288" HEIGHT="288">
<P><A href="full__sex__city__2__t.jpg"><img
src="sex__city__2__t.jpg" border="0" /></ A></P>
</TD></TR></TABLE>
<TABLE WIDTH="100%" BORDER="1"><TR>
<TD HEIGHT="288">
<B>PID: </B>141896<BR/>
<B>Asset Title:</B>If walls could talk 2<BR/>
<B>Comments:</B>An HBO Films trilogy examining
the lesbian experience in America in three different decades<BR/>
<B>Resolution:</B> 72 dpi<BR/>
<B>Talent:</B>Ellen Degeneres<BR/></TD>
<TD WIDTH="288" HEIGHT="288">
<P><A href="full__walls__5__t.jpg">
< imgsrc="walls__5__t.jpg" border="0"/></ A></P> </TD>
</TR></TABLE>
</HTML>
```

EXAMPLE 3c (filename: css.xml)

```
<?xml version=1.0"?>
<xsl:stylesheet version="1.0"
xmlns:xsl="http://www .w3.org/1999/xsl/transform">
<xsl:template match="/">
<xsl: processing-instruction name="xml-stylesheet">type="text/css"
href="#photos"
</xsl : processing-instruction>
<xsl:apply-templates select="DAL"/>
</xsl:template>
<xsl:template match=".">
<xsl:copy><xsl:value-of select="."/></xsl:copy>
</xsl:template>
<xsl:template match="DAL ">
<style id=photos">
Asset
{display: block;
position:relative;width:100%;height:225px;border:inset3px gray;}
Assetmetadata {display:inline;font-size:14pt;}
Photo {display:inline;font-size:12pt;}
Photometadata {display:inline;font-size: 12pt;}
Content
{width:72 px; height:72px;position:relative;display:block;float:left;}
<xsl:for-each select="//Asset">Content[photo<xsl:value-of
select="@PID"/> ]
```

-continued (filename: css.xml)

```
{background-image:url(<xsl:value-of select="Content"/>);}
</xsl:for-each>
</style>
<xsl:apply-templates select="Asset"/>
</xsl:template>
<xsl:template match="/DAL/Asset/Content">
<Content id ="{concat(Photo',
sibling::Assetmetadata/@PID)}
href="{sibling::Asset/Content}"/>
</xsl:template>
<xsl:template match="/DAL/Asset">
<TABLE WIDTH="100%" BORDER="1"><TR><TD HEIGHT="288">
<B>PID: </B><xsl:value-of select=Assetmetadata/@PID/><BR/>
<B>Asset Title:</B>
<xsl:value-of select="Assetmetadata/@AssetTitle" /><BR/>
<B>Comments:</B><xsl:value-of
select="Assetmetadata/@Comments" /><BR/>
<B>Resolution:</B><xsl:value-of
select="Photo/Photometadata/@Resolution"/><BR/>
<B>Talent:</B><xsl:value-of
select="Photo/Photometadatal@Talent"/>< BR/>
</TD>
<TD WIDTH="288" HEIGHT="288">
<xsl:apply-templates />
</TD>
</TR></TABLE>
</xsl:template>
<xsl:template match="/DAL Asset/Content">
<P><A
href="{concat('photo',sibling::asset/content )}">
<img src="{ancestor::Asset/Content}" border="0"/>
</A></P>
</xsl:template>
</xsl:stylesheet>
```

Thus it is seen that XML data definitions for digital assets are provided that can be used as a standardized dictionary for application and platform independent exchange and repurposing of those assets. One skilled in the art will appreciate that the present invention can be practiced by other than the described embodiments, which are presented for purposes of illustration and not of limitation, and the present invention is limited only by the claims which follow.

We claim:

1. A method of storing digital assets, the digital assets comprising at least three different types of digital assets selected from the group consisting of still images, video recordings, movies, audio recordings, graphics, promos, voiceovers, and text, the method comprising:

arranging metadata of a first type of digital asset in accordance with a document type definition (DTD) comprising declared elements and attributes for at least three different types of digital assets, the at least three different types of digital assets including still images, video recordings and at least one of audio recordings, movies, graphics, promos, voiceovers, and text, the DTD further comprising declared elements and attributes for rights management of the at least three different types of digital assets, the rights management elements and attributes comprising metadata for at least one of:
a contract identifier,
an availability start date,
an availability end date,
an allowed number of plays per agreement,
a copyright holder identifier, or
a worldwide rights identifier;
the DTD defining metadata for still images and metadata attributes for the still images metadata, the still images metadata attributes comprising at least one of:
a definition for black/white,
a definition for color,
a definition for caption, or
a definition for legal restrictions;
the DTD also defining metadata for video recordings and metadata attributes for the video recordings metadata, the video recordings metadata attributes comprising at least one of:
a definition for title,
a definition for version,
a definition for author,
a definition for caption, or
a definition for ownership rights;
the DTD further defining metadata for audio recordings and metadata attributes for the audio recordings metadata, the audio recordings metadata attributes comprising at least one of:
a definition for music;
a definition for track title;
a definition for duration;
a definition for compact disc (CD) number;
a definition for CD title; or
a definition for rights issues regarding use of an audio recording;
arranging metadata of a second type of digital asset in accordance with the DTD, the second type different from the first type;
arranging metadata of a third type of digital asset in accordance with the DTD, the third type different from the first type and the second type;
storing a first digital asset of the first type in a database, the first type comprising a still image;
storing a second digital asset of the second type in the same database as the first digital asset, the second type comprising a video recording; and
storing a third digital asset of the third type in the same database as the first and second digital assets, the third type comprising an audio recording;
wherein:
the method is performed by a computer system comprising:
a server comprising the database storing the first, second, and third different types of digital assets; and
a computer readable storage medium comprising the DTD, the computer readable storage medium accessible by the server.

2. The method of claim 1 further comprising storing the metadata of the first, second, and third types of digital assets in the same database as the first, second, and third digital assets.

3. The method of claim 1 wherein the arranging of metadata for a first type of digital asset comprises arranging metadata of a first type of digital asset in accordance with the DTD comprising declared elements and attributes for movies wherein the movie metadata attributes comprise at least one of:
a definition for title;
a definition for version;
a definition for rating;
a definition for minutes;
a definition for release date;
a definition for run time;
a definition for color;
a definition for synopsis;
a definition for director;
a definition for cast; and
a definition for allowable usage of a movie.

4. The method of claim 1 further comprising storing a fourth digital asset comprising a movie.

5. The method of claim 1 wherein the stored still image relates to a same subject matter as the stored video recording or the stored audio recording.

6. A computer readable storage medium storing computer-executable instructions executable by a computer for performing the method of claim 1.

7. A method of storing digital assets, the digital assets comprising at least three different types of digital assets selected from the group consisting of still images, video recordings, movies, audio recordings, graphics, promos, voiceovers, and text, the method comprising:
   arranging metadata of a first type of digital asset in accordance with a document type definition (DTD) comprising declared elements and attributes for at least three different types of digital assets, the at least three different types of digital assets including still images, movies, and at least one of video recordings, audio recordings, graphics, promos, voiceovers, and text, the DTD further comprising declared elements and attributes for rights management of the at least three different types of digital assets, the rights management elements and attributes comprising metadata for at least one of:
      a contract identifier,
      an availability start date,
      an availability end date,
      an allowed number of plays per agreement,
      a copyright holder identifier, or
      a worldwide rights identifier;
   the DTD defining metadata for still images and metadata attributes for the still images metadata, the still images metadata attributes comprising at least one of:
      a definition for black/white,
      a definition for color,
      a definition for caption, or
      a definition for legal restrictions;
   the DTD also defining metadata for movies and metadata attributes for the movies metadata, the movies metadata attributes comprising at least one of:
      a definition for title;
      a definition for version;
      a definition for rating;
      a definition for minutes;
      a definition for release date;
      a definition for run time;
      a definition for color;
      a definition for synopsis;
      a definition for director;
      a definition for cast; or
      a definition for allowable usage of a movie;
   the DTD further defining metadata for promos and metadata attributes for the promos metadata, the promos metadata attributes comprising at least one of:
      a definition for title,
      a definition for airmaster number,
      a definition for writer/producer,
      a definition for duration,
      a definition for announcer,
      a definition for trailer,
      a definition for kill date,
      a definition for comments, or
      a definition for Internet rights;
   arranging metadata of a second type of digital asset in accordance with the DTD, the second type different from the first type;
   arranging metadata of a third type of digital asset in accordance with the DTD, the third type different from the first type and the second type;
   storing a first digital asset of the first type in a database, the first type comprising a still image;
   storing a second digital asset of the second type in the same database as the first digital asset, the second type comprising a movie; and
   storing a third digital asset of the third type in the same database as the first and second digital assets, the third type comprising a promo; wherein:
   the method is performed by a computer system comprising:
      a server comprising the database storing the first, second, and third different types of digital assets; and
      a computer readable storage medium comprising the DTD, the computer readable storage medium accessible by the server.

8. The method of claim 7 further comprising storing the metadata of the first, second, and third types of digital assets in the same database as the first, second, and third digital assets.

9. The method of claim 7 further comprising storing a fourth digital asset comprising a video recording.

10. The method of claim 7 wherein the stored still image and the stored promo relate to the stored movie.

11. A computer readable storage medium storing computer-executable instructions executable by a computer for performing the method of claim 7.

12. A method of storing digital assets, the digital assets comprising at least three different types of digital assets selected from the group consisting of still images, video recordings, movies, audio recordings, graphics, promos, voiceovers, and text, the method comprising:
   arranging metadata of a first type of digital asset in accordance with a document type definition (DTD) comprising declared elements and attributes for at least three different types of digital assets, the at least three different types of digital assets including movies, promos, and at least one of still images, video recordings, audio recordings, graphics, voiceovers, and text, the DTD further comprising declared elements and attributes for rights management of the at least three different types of digital assets, the rights management elements and attributes comprising metadata for at least one of:
      a contract identifier,
      an availability start date,
      an availability end date,
      an allowed number of plays per agreement,
      a copyright holder identifier, or
      a worldwide rights identifier;
   the DTD defining metadata for movies and metadata attributes for the movies metadata, the movies metadata attributes comprising at least one of:
      a definition for title;
      a definition for version;
      a definition for rating;
      a definition for minutes;
      a definition for release date;
      a definition for run time;
      a definition for color;
      a definition for synopsis;
      a definition for director;
      a definition for cast; or
      a definition for allowable usage of a movie the DTD also defining metadata for promos and metadata attributes for the promos metadata, the promos metadata attributes comprising at least one of:
- a definition for title,
- a definition for airmaster number,
- a definition for writer/producer,
- a definition for duration,
- a definition for announcer,
- a definition for trailer,
- a definition for kill date,
- a definition for comments, or
- a definition for Internet rights;

the DTD further defining metadata for audio recordings and metadata attributes for the audio recordings metadata, the audio recordings metadata attributes comprising at least one of:
- a definition for music;
- a definition for track title;
- a definition for duration;
- a definition for compact disc (CD) number;
- a definition for CD title; or
- a definition for rights issues regarding use of an audio recording;

arranging metadata of a second type of digital asset in accordance with the DTD, the second type different from the first type;

arranging metadata of a third type of digital asset in accordance with the DTD, the third type different from the first type and the second type;

storing a first digital asset of the first type in a database, the first type comprising a movie;

storing a second digital asset of the second type in the same database as the first digital asset, the second type comprising a promo; and storing a third digital asset of the third type in the same database as the first and second digital assets, the third type comprising an audio recording;

wherein:
the method is performed by a computer system comprising:
- a server comprising the database storing the first, second, and third different types of digital assets; and
- a computer readable storage medium comprising the DTD, the computer readable storage medium accessible by the server.

13. The method of claim 12 further comprising storing the metadata of the first, second, and third types of digital assets in the same database as the first, second, and third digital assets.

14. The method of claim 12 further comprising storing a fourth digital asset comprising text.

15. The method of claim 12 wherein the stored movie, the stored audio recording, and the stored promo are all related to same subject matter.

16. A computer readable storage medium storing computer-executable instructions executable by a computer for performing the method of claim 12.

* * * * *